Feb. 18, 1941.    P. A. HILLIARD    2,232,234
AUTOMATIC VARIABLE SPEED POWER TRANSMISSION MECHANISM
Filed Jan. 31, 1939

Inventor.
Perley A. Hilliard
by Heard Smith & Tennant.
Attys

Patented Feb. 18, 1941

2,232,234

UNITED STATES PATENT OFFICE 2,232,234

AUTOMATIC VARIABLE SPEED POWER TRANSMISSION MECHANISM

Perley A. Hilliard, Newton, Mass.

Application January 31, 1939, Serial No. 253,792

5 Claims. (Cl. 74—64)

This invention relates to variable speed power transmission mechanism for transmitting power from a driving member to a driven member, and it relates particularly to a variable speed power transmission mechanism which is automatic in its action so that the speed of the driven member will vary relative to the speed of the driving member automatically as the load varies.

A power transmission mechanism of this type has the advantage that to a certain extent it eliminates the use of variable speed transmission gears which involve the necessity of manipulating the gear shift lever for changing the gears to give the driven member different speed ratios relative to the driving member.

One of the objects of my present invention is to provide a simple form of automatic speed power transmission mechanism which is well adapted to use in automobiles and in other mechanism that requires more or less constant changing of the speed ratios between the driving member and the driven member.

A further object of the invention is to provide a novel automatic variable speed power transmission mechanism which is constructed so that whenever said mechanism is operating, there will be a smooth flow of power from the driving member to the driven member, regardless of any change in the relative speed of the driving member and the driven member.

In order to give an understanding of the invention, I have illustrated in the drawing a selected embodiment after which the novel features will be pointed out in the appended claims.

Figure 1:
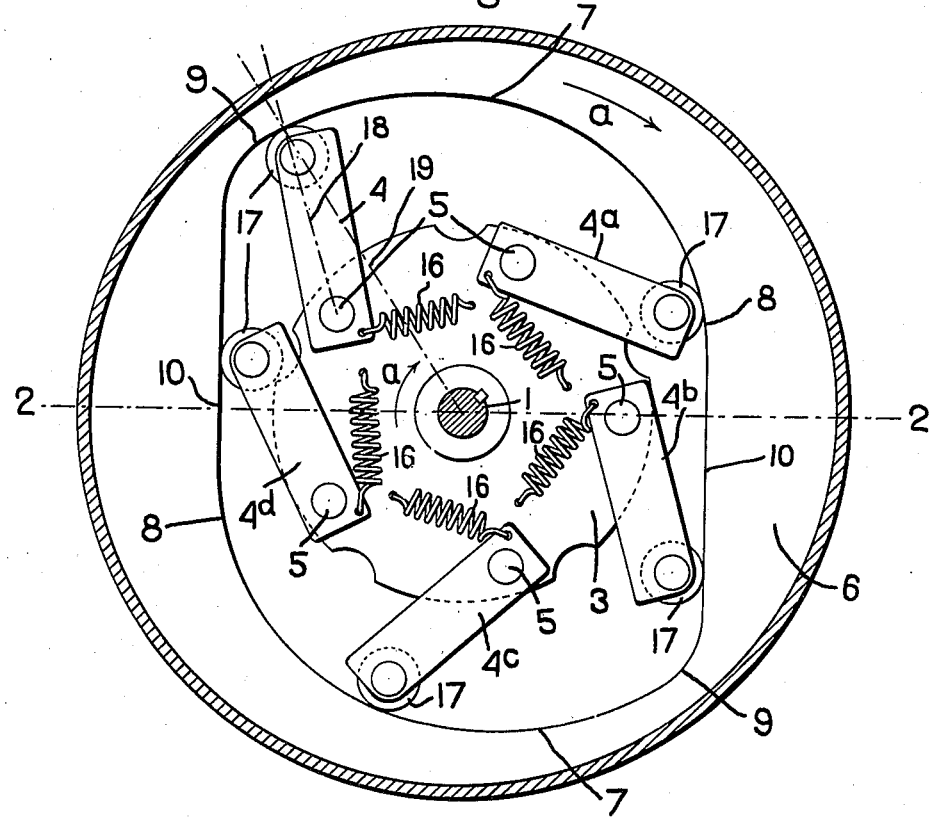
Fig. 1 is a sectional view through a complete power transmission mechanism embodying the invention taken on the line 1—1, Fig. 2.
Figure 2:
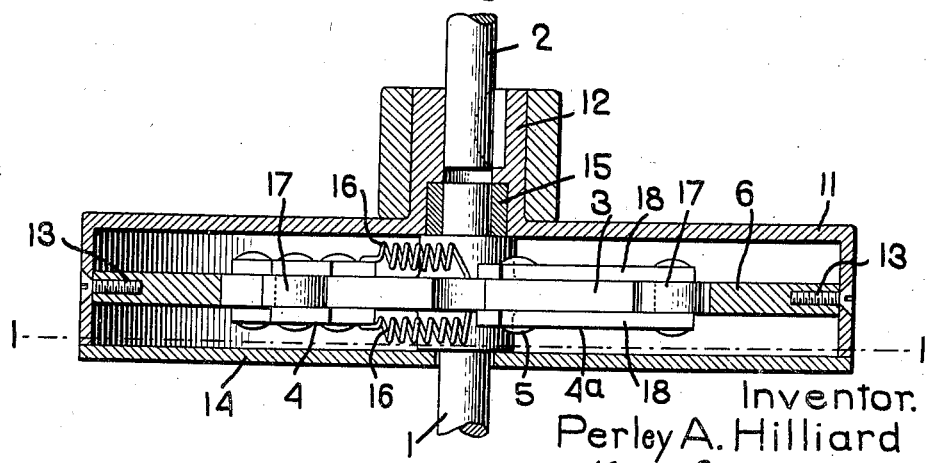
Fig. 2 is a section on the line 2—2, Fig. 1.

In the drawing, 1 indicates a driving shaft to which power is applied in any suitable way, and 2 indicates a driven shaft which is rotated from the shaft 1 through the power transmitting mechanism embodying my invention.

The driving shaft 1 has fast thereon a disk member 3 to which is pivoted a plurality of power transmitting arms, there being five such arms, 4, 4a, 4b, 4c, and 4d illustrated in the present embodiment of the invention, although the number of these power transmitting arms may be increased or decreased from that which is shown without in any way departing from the invention.

These power transmitting arms are pivotally secured to the disk 3 as shown at 5 and said arms cooperate with a second disk 6 which is rigid with the driven shaft 2 and which forms part of the driven member of the transmission mechanism. This disk is provided with one or more interior eccentric surfaces 7 against which the power transmitting arms 4, 4a, 4b, etc., may engage.

The disk 6 may be made with a single eccentric surface 7 or with two or more such surfaces. In the construction herein shown, there are two such eccentric surfaces 7 which are oppositely disposed, the high point 8 of each surface being connected to the low point 9 of the other surface by a connecting surface 10.

This disk 6 may be secured to the shaft 2 in any desirable way without departing from the invention. In the construction shown, the disk is housed within a housing member 11 which is provided with a hub 12 that is keyed to the shaft 2, said disk 6 having its periphery secured to the peripheral portion of the housing 11 by means of screws 13. The housing 11 is formed with a removable cover plate 14 through which the shaft 1 extends, and the hub 12 of the housing is shown as having a bearing 15 in which the end of the shaft 1 is received. The shafts 1 and 2 are thus kept in axial alinement.

Each concentric surface 7 is so disposed that the high point 8 is at the leading end thereof and the low point 9 at the trailing end.

The thrust arms 4 are of such a length and so disposed that the pivotal point 5 of each arm is on the trailing side of a radial line passing through the point of engagement between the arm and the surface 7. Each thrust or power transmitting arm is acted on by a spring 16 which yieldingly holds the outer end of the arm against the surface 7, one end of each spring being connected to its arm 4 and the other end being connected to the disk 3.

These arms 4, 4a, 4b, etc., may bear directly against the surfaces 7, 10, or each arm may carry at its end a roll 17 which bears against and has rolling contact with said surface.

In the construction shown each arm 4, 4a, 4b, etc., is a twin arm, it comprising the two sections 18, one situated either side of the disk 3. The rolls 17 are confined between the two sections and the two sections embrace the periphery of the disk 3 and are secured thereto by the pivots 5.

Assuming that the driving member is rotating clockwise, Fig. 1, or in the direction of the arrow a, and that the driven member is stationary, each arm will apply force to the surfaces 7, 10, in the direction of the length of the arm. In the case of the arm 4, said arm will deliver the turning force to the surface 7 in the direction of the line 18, which has an angular relation to the radial line 19 passing through the point at which the arm 4 contacts with the surface 7. The turning force delivered along the line 18 will tend to give rotation to the driven member, but as said member 6 is stationary, said arm will slide along the eccentric surface 7 until it reaches the position of the arm 4a. During the travel of the arm from the position of the arm 4 to the position of the arm 4a, said arm will be delivering a turning moment to the member 6. As the driving member continues its rotation, and the arm moves from the position of the arm 4a to that of the arm 4b, said arm merely moves over the connecting surface 10 but does not transmit any appreciable turning moment to the driven member. When the arm reaches the low point 9 of the next eccentric 7, then said arm again delivers a turning moment to the disk 6 until the arm has reached the high portion 8.

Therefore, as the driving member rotates, each arm 4, 4a, 4b, etc., will be delivering torque to the disk 6 while passing over each eccentric surface 7, and thus each arm will give two power impulses to the driven member for each rotation of the driving member.

If the driven member is free to rotate but is stationary, the action of the arms 4 on the eccentric surface 7 will start the driven member in rotation and will gradually build up the speed thereof to maximum.

If there is small resistance to the rotation of the driven member, then the speed of the driven member will gradually pick up until it is equal to that of the driving member, but if there is considerable resistance to the rotation of the driven member, then the maximum speed attained by the driven member will be somewhat slower than that of the driving member, and the arms 4, 4a, 4b, etc., will move over the surfaces 7 and 10 as they are delivering torque to the driven member.

The amount of power or turning moment which is delivered from the driving member to the driven member through the arms 4 varies with the speed of rotation of the driving member. At a very slow speed of rotation, there will be little if any torque delivered from the driving to the driven member. As the speed of the driving member increases, the centrifugal force on the arms 4 cause them to bear with greater pressure against the eccentric surface 7, and the result is that the turning moment or torque delivered by each arm 4 to the driven member will be greatly increased, and at a high speed, the torque delivered may be sufficient so that the driving and driven members will be coupled together to rotate in unison.

This power transmission mechanism is well adapted for use in automobiles, either with or without the usual transmission gears and gear shift lever, and when used with the transmission gears, it reduces to a great extent the necessity for shifting such gears in the operation of the automobile.

This device may be constructed so that at the idling speed of an automobile engine, the torque delivered from the driving member to the driven member would be practically nil. As the operator steps on the accelerator and thus increases the speed of the engine, the torque delivered to the driven member will increase, thus gradually setting the driven member and the automobile in motion. If the operator wishes to move his car slowly, he will simply control his accelerator so as to operate his engine at a speed which will produce the desired speed in the driven member, and the speed of the driven member may be increased by simply speeding up the engine or may be decreased by reducing the speed of the engine.

If the automobile is travelling on a road surface and starts on an upgrade but the operator does not change the speed of the engine, the result will simply be a greater slippage between the driving member and the driven member with a resultant slowing down of the speed of the automobile, but the speed of the automobile on the upgrade can be increased by simply giving the engine more gas and thus increasing the speed of the driving member.

Since there is no positive coupling of the driving and driven members, there is no danger of stalling the engine when climbing a hill, or if the power required to rotate the driven member is greater than can be delivered by the power transmission mechanism.

The use of my improved power transmission mechanism in automobiles will, therefore, greatly simplify the operation of the automobile because the speed of the automobile from zero to maximum is controlled entirely by the accelerator.

I claim:

1. A power transmission mechanism comprising coaxial rotary driving and driven members, one of said members having a central opening, a part at least of the wall of which constitutes an eccentric driving surface, a plurality of outwardly directed non-radial thrust arms pivoted to the other member and adapted to bear at their outer ends against said driving surface, thereby to afford a driving connection between the driving and driven members, the spacing of said thrust arms being such relative to the length of said driving surface that at all times at least two arms will be in contact with said surface and the pivotal point for each thrust arm being at that side of a radial line drawn from the axis of rotation through the point of contact between said arm and the driving surface which places the arm in an inclined position relative to said radial line such that it is subjected to a thrust strain in the direction of its length when driving torque is being transmitted from the driving member to the driven member.

2. A power transmission mechanism comprising coaxial driving and driven members, one of said members having a central opening and the wall of the opening presenting a plurality of eccentric driving surfaces, a plurality of non-radial outwardly directed thrust arms pivoted at their inner ends to the other member and adapted to bear at their outer ends against said eccentric driving surface, thereby to afford a driving connection between the driving and driven members, the spacing of said thrust arms being such relative to the length of said driving surface that at all times at least two arms will be in contact with said surface and the pivotal point for each thrust arm being at one side of a radial line drawn from the axis of rotation through the point of contact between said arm and the driving surfaces and each arm being inclined to said radial line in a direction such that the driving torque is transmitted from the driving member to the driven member by thrust strains in and extending longitudinally of said arms.

3. A power transmission mechanism comprising coaxial rotary driving and driven members, the driven member having a central opening, the wall of which is shaped to present a plurality of eccentric driving surfaces, a plurality of outwardly directed arms pivoted at their inner ends to the driving member and adapted to bear at their outer ends against said eccentric surfaces, thereby to afford a driving connection between the driving and driven members when the driving member is rotated, the spacing of said thrust arms being such relative to the length of said driving surface that at all times at least two arms will be in contact with said surface and the pivotal point for each thrust arm being on the trailing side of a radial line drawn from the axis of rotation through the point of contact between said arm and the driving surface.

4. A power transmission mechanism comprising coaxial rotary driving and driven members, the driven member having a central opening, and a part at least of the wall of said opening constituting an eccentric driving surface with the trailing end of said surface at a greater radial distance from the axis of rotation than the leading end, a plurality of outwardly directed thrust arms pivoted at their inner ends to the driving member and adapted to bear at their outer ends against said driving surface, thereby to afford a driving connection between the driving and driven members when the driving member is rotated, the spacing of said thrust arms being such relative to the length of said driving surface that at all times at least two arms will be in contact with said surface and the pivotal point for each thrust arm being on the trailing side of a radial line drawn through the point of contact between said arm and the driving surface, whereby each arm is subjected to a thrust strain in the direction of its length when driving torque is being transmitted from the driving member to the driven member.

5. A power transmission mechanism comprising a rotary driven member having an inwardly facing eccentric driving surface, a rotary driving member coaxial with the driven member and comprising a hub and a plurality of power transmitting thrust arms pivoted at their inner ends to the hub and adapted to bear at their outer ends against said eccentric surface, thereby to provide a driving connection between the driving and driven members, the spacing of said thrust arms being such relative to the length of said driving surface that at all times at least two arms will be in contact with said surface and the pivotal point of each arm being on the trailing side of a radial line extending through the point of contact between said arm and the driving surface, whereby each arm is subjected to a thrust strain in the direction of its length when driving torque is being transmitted from the driving member to the driven member.

PERLEY A. HILLIARD.